United States Patent [19]

Gursky et al.

[11] Patent Number: 5,532,312

[45] Date of Patent: Jul. 2, 1996

[54] TIRE SIDEWALL COMPOSITION

[75] Inventors: Leonard J. Gursky, East Brunswick; James V. Fusco, Red Bank; Douglas D. Flowers, Woodbridge, all of N.J.

[73] Assignee: Exxon Chemical Patents, Inc., Wilmington, Del.

[21] Appl. No.: 439,639

[22] Filed: May 12, 1995

Related U.S. Application Data

[63] Continuation of Ser. No. 206,915, Mar. 7, 1994, abandoned, which is a continuation of Ser. No. 913,262, Jul. 14, 1992, abandoned, which is a continuation-in-part of Ser. No. 638,713, Jan. 8, 1991, abandoned, which is a continuation-in-part of Ser. No. 567,965, Aug. 15, 1990, abandoned.

[51] Int. Cl.$^6$ .............................. B60C 13/00; C08L 7/00; C08L 25/16

[52] U.S. Cl. ..................................... 525/232; 152/151

[58] Field of Search ........................... 525/232; 152/151

[56] References Cited

U.S. PATENT DOCUMENTS

| | | | |
|---|---|---|---|
| 3,508,595 | 4/1970 | Wilson | 152/330 |
| 3,630,974 | 12/1971 | Ladosci et al. | 260/5 |
| 3,830,274 | 8/1974 | Waser, Jr. | 152/355 |
| 3,865,763 | 2/1975 | Feniak | 260/5 |
| 4,224,196 | 9/1980 | Gursky | 260/3.5 |
| 4,244,841 | 1/1981 | Frankland | 521/43.5 |
| 4,341,672 | 7/1982 | Hsieh et al. | 525/332.8 |
| 4,483,381 | 11/1984 | Scriver | 525/236 |
| 4,485,833 | 12/1984 | Uraneck et al. | 525/332.9 |
| 4,537,932 | 8/1985 | Uraneck et al. | 525/332.9 |
| 4,548,995 | 10/1985 | Kowalski et al. | 525/354 |
| 5,063,268 | 11/1991 | Young | 525/214 |
| 5,162,445 | 11/1992 | Powers et al. | 525/333.4 |

FOREIGN PATENT DOCUMENTS 0344021  11/1989  European Pat. Off. .

*Primary Examiner*—Thomas Hamilton, III
*Attorney, Agent, or Firm*—Myron B. Kurtzman; John E. Schneider

[57] ABSTRACT

A tire sidewall composition having improved properties is provided. The composition comprises a halogen-containing copolymer of a $C_4$ to $C_7$ isomonoolefin and a para-alkylstyrene, and an unsaturated rubber, such as natural rubber. Tires comprising the sidewalls are also provided.

22 Claims, No Drawings

TIRE SIDEWALL COMPOSITION

This is a continuation of application Ser. No. 08/206,915, filed Mar. 7,1994, now abandoned, which is a continuation of application Ser. No. 07/913,262, filed Jul. 14, 1992, now abandoned, which is a continuation-in-part of application Ser. No. 07/638,713, filed Jan. 8, 1991, now abandoned, which is a continuation-in-part of application Ser. No. 07/567,965, filed Aug. 15, 1990, now abandoned.

BACKGROUND OF THE INVENTION

1. Field of the Invention

The present invention relates to tire sidewall compositions which exhibit improved ozone resistance and fatigue crack propagation resistance, as well as good sidewall adhesion to the tire carcass and good heat build-up.

2. Description of Information Disclosures

Rubber tires, such as pneumatic tires, include many components, such as, for example, sidewalls, which may be decorative and may have incorporated therein a titanium dioxide pigment. Sidewalls are continuously subjected to distortion under the normal road operating conditions, and the sidewalls are subjected to extensive continuous flexing and can crack under such flexing conditions. In addition to such flex cracking, such sidewalls are also subjected to atmospheric chemical action such as by ozone attack. The overall effect is that the sidewalls may erode and degrade and can even separate from the tire carcass during use and can cause the tire to fail.

Generally, the current practice in the manufacture of black sidewalls is to add chemical protectants to general purpose rubbers in an attempt to minimize ozone and flex cracking but they tend to be fugative and staining in the case of contact with white sidewalls combination. In some cases, and in particular white sidewalls, polymer blends have been used to effect improvement in ozone and flex resistance.

A composition which attempts to overcome these problems is disclosed in U.S. Pat. No. 3,508,595 to Wilson, and assigned to the General Tire & Rubber Company. This patent discloses a blend of chlorobutyl rubber, natural rubber, and ethylene propylene terpolymer as the protective cover for the white sidewalls used in such pneumatic tire construction.

U.S. Pat. No. 3,630,974 to Ladocsi, et al., assigned to Exxon Research and Engineering Company, further discloses the use of terpolymers for blending into high unsaturation rubbers in order to enhance their static ozone resistance. This patent also discloses a triblend of halobutyl rubber along with a terpolymer and a high-unsaturation rubber to improve dynamic ozone resistance and heat flex resistance. The terpolymers employed by this patentee comprise ethylene, propylene and a diene, and the high unsaturation rubber can include natural rubber, styrene butadiene rubber, and polybutadiene rubber, etc. It is again noted that various fillers can be used in these compositions, and among the variety of materials listed are various "oils" along with resins, waxes, etc. The patentee specifically discloses the use of 10 parts oil per 100 parts of rubber in these formulated blends. This patent also discloses that the terpolymer used will not include more than 10 or 20% of the diolefin therein. It is also noted that while U.S. Pat. No. 3,865,763 to Feniak, assigned to Polysar Limited, is primarily concerned with stabilization of halogenated butyl rubber with boron compounds, Example 5 of that patent discloses a combination of brominated butyl rubber with both an ethylene propylene rubber and a styrene butadiene rubber.

U.S. Pat. No. 3,830,274 to Waser, Jr., assigned to The Goodyear Tire and Rubber Company, discloses yet another elastomer blend for use in pneumatic tire sidewall compositions, which contains an ethylene propylene non-conjugated diene terpolymer along with bromobutyl rubber and a cis-1,4 polyisoprene rubber such as natural or synthetic rubber, along with a rubbery cis-1,4 polybutadiene with a specified molecular weight distribution. The patentee sates that this blend provides substantially improved hot flex-life and carcass adhesion properties for tire sidewalls.

U.S. Pat. No. 4,224,196 discloses a sidewall composition having improved flex resistance, wherein the blend composition comprises a blend of a halobutyl rubber, a highly unsaturated rubber and an oil extended EPDM terpolymer.

There is still a need for improvement in properties of tire sidewalls.

SUMMARY OF THE INVENTION

The present invention relates to tire sidewall compositions which comprise a blend composition of at least one highly unsaturated rubber, and a brominated copolymer of an isoolefin and a para-alkylstyrene, wherein the blend compositions exhibit improved ozone resistance and fatigue crack propagation resistance as well as good sidewall adhesion to the tire carcass, good heat build-up, and good aging characteristics, wherein the compositions may additionally optionally include an EPDM terpolymer and/or halobutyl rubber.

In a preferred embodiment of the present invention the sidewall composition comprises from about 10 to about 90 parts of a highly unsaturated rubber such as of natural rubber, and from about 10 to about 90 parts of brominated copolymer of an isoolefin and a para-alkylstyrene, wherein the alkylstyrene unit is halogenated (e.g. brominated) and characterized by the formula:

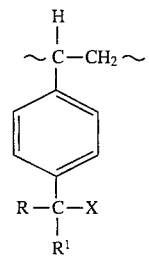

wherein R and $R^1$ are independently selected from the group consisting of hydrogen, alkyl groups having about 1 to about 5 carbon atoms, and primary and secondary alkyl halides having about 1 to about 5 carbon atoms and X is selected from the halogen group consisting primarily of bromine and chlorine and mixtures thereof. Furthermore, the halogenated para-alkylstyrene unit is shown as being pendant from the isoolefin polymer chain, represented by wavy lines in the formula.

The sidewall compositions of the present invention can be compounded by methods generally known in the rubber compounding art, such as by mixing with the uncured polymers various fillers such as titanium dioxide; carbon black, when black sidewalls are desired, or non-black fillers and pigments and the absence of carbon black when white sidewalls are desired; extenders such as rubber process oils; curing aids such as zinc oxide, sulphur; accelerators or retarders and other additives such as anti-oxidants, and anti-ozonants.

DETAILED DESCRIPTION OF THE INVENTION

The principal advantages realized in accordance with the present invention primarily stem from the fact that by employing the halogenated copolymer of isoolefin and para-alkylstyrene in blends with general purpose rubber (GPR), i.e., highly unsaturated, one obtains improved ozone resistance and fatigue crack propagation of these compositions as well as improved sidewall adhesion.

It has also been found that compositions having desirable characteristics can be obtained by utilizing the halogenated para-alkylstyrene copolymer with only one other unsaturated rubber such as natural rubber in the absence of other rubber components. This is particularly effective in white sidewall formulations.

The tire sidewall composition of the present invention comprises blend compositions of from about 10 to about 90 parts by weight per hundred of total rubber content of at least one highly unsaturated rubber selected from the group consisting of natural rubber, SBR rubber, polyisoprene and polybutadiene rubber, preferably about 20 to about 80, more preferably about 30 to about 70; and from about 10 to about 90 parts per hundred of a halogenated copolymer of an isoolefin and a para-alkylstyrene, wherein the halogen is bonded to the para-alkyl group of the para-alkyl styrene unit, more preferably about 15 to about 85 and most preferably about 20 to about 80 parts; for example, about 30 to about 70 parts. In particularly preferred compositions useful in tire sidewalls, the halogenated copolymer comprises at least about 35 to about 75 parts, for example, 40 parts, and the highly unsaturated rubber comprises natural rubber and/or polybutadiene rubber. The blend composition may also optionally include from about 1 to about 90, preferably about 5 to about 40 parts of halobutyl rubber and/or from about 1 to about 40 parts, preferably about 5 to about 20 parts per hundred of EPDM. When white sidewalls are desired, particularly preferred compositions comprise the halogenated para-alkylstyrene copolymers and natural rubber in a weight ratio of halogenated para-alkylstyrene copolymers to natural rubber ranging from about 0.28:1 to about 3:1, preferably from about 0.67:1 to about 1:1. The preferred halogenated para-alkylstyrene copolymer for the white sidewall embodiment comprises preferably from about 5 to about 15, more preferably from about 5 to about 10 weight percent para-alkylstyrene moieties and preferably from about 1 to about 2 wt. % more preferably about 2 weight percent halogen. In addition to the rubber components, the white sidewall tire composition may comprise additional additives such as non-black fillers and pigments, and processing aids.

The highly unsaturated rubbers of the present blend compositions are selected from the group consisting of natural rubbers, polyisoprene rubber, styrene butadiene rubber (SBR) and polybutadiene rubber and mixtures thereof. The natural rubbers of the present invention are selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of about 30 to about 120, more preferably about 40 to about 65. The Mooney viscosity test referred to herein is in accordance with ASTM D-1646.

The Mooney viscosity of the polybutadiene rubber of the present invention as measured at 100° C. (ML 1+4) may range from about 40 to about 70, more preferably about 45 to about 65, and most preferable about 50 to about 60. When both natural rubber and polybutadiene are employed in the present invention, a suitable weight ratio of the natural rubber to the polybutadiene ranges from about 100 to 1 to 1 to 100, more preferably 5 to 1 to 1 to 5, and most preferably 2 to 1 to 1 to 2.

EPDM is the ASTM designation for a terpolymer of ethylene, propylene and a non-conjugated diolefin. In such terpolymers the ethylene and propylene form a fully saturated backbone of methylene linkages with the nonconjugated diolefin, e.g. dicyclopentadiene or substituted norbornene, attached so as to provide unsaturated side chains with readily available crosslinking sites for sulphur curing. The EPDM elastomers thus contain a fully saturated backbone which provides outstanding resistance to oxidation, ozone, and cracking, as well as excellent low temperature flexibility. The Mooney viscosity of the EPDM terpolymer as measured at 125° C. is about 20 to 80, more preferably about 25 to 75 and most preferably about 40 to about 60. The ethylene content of the EPDM terpolymers may range from about 20 to about 90 weight percent, preferably from about 30 to about 85, more preferably from about 35 to about 80 weight percent. The total diene monomer content in the EPDM terpolymers may suitably range from about 0.1 to about 15 weight percent, preferably from about 0.5 to about 12 weight percent.

The non-conjugated dienes may be straight chain or cyclic hydrocarbon diolefins having from 6 to 15 carbon atoms, such as dicyclopentadiene, tetrahydroindene, including alkyl substituted tetrahydroindenes, 5-methylene- 2-norbornene, 5-vinyl-2-norbornene, 2-methyl-norbornadiene, 2,4-dimethyl-2,7-octadiene, 1-4-hexadiene, 5-ethylidene-2-norbornene, and 3-methyl cyclopentene. The most preferred compounds include 5-methylene-2-norbornene, dicylopenta-diene, 1,4-hexadiene, 5-ethylidene- 2-norbornene, and 4,7,8,9-tetrahydroindene. A preferred EPDM terpolymer of the present invention is Vistalon® 6505 manufactured by Exxon Chemical Company.

The term "butyl rubber" as employed herein is intended to refer to a vulcanizable rubbery copolymer containing, by weight, from about 85 to 99.5% combined isoolefin having from 4 to 8 carbon atoms and 0.5 to 15% combined conjugated diolefin having 4 to 8 carbon atoms. Such copolymers and their preparation are well known. The isoolefin, such as isobutylene, is admixed with a conjugated diolefin having about 4 to 8 carbon atoms, such as butadiene or isoprene, preferably isoprene. An inert diluent selected from C4 to C8 aliphatic alkanes and chlorinated hydrocarbons such as methyl chloride, ethyl chloride, methylene chloride and ethylene dichloride are admixed therewith. The monomers may form from 10 to 50% by weight of the total monomer/diluent mixture. The mixture is cooled and polymerized in a reactor at a temperature in the range from about 0° C. to about 165° C. using a cationic catalyst such as aluminum chloride, aluminum bromide, aluminum ethyl dichloride, titanium tetrachloride or boron trifluoride. The polymerization reaction proceeds rapidly to produce a copolymer in the form of a slurry in the diluent. The slurry is removed from the reactor and the copolymer separated therefrom and recovered by well-known methods.

The preferred butyl rubbers which are used to produce halogenated rubbers useful in this invention are copolymers of isobutylene and isoprene which are normally produced using methyl chloride as diluent and aluminum trichloride catalyst. Preferably the copolymers have an isobutylene content of from about 95 to 99.5 weight percent. The halogenated copolymer should preferably contain at least about 0.5 weight percent of combined halogen, but not more than about one atom of chlorine or three atoms of bromine per double bond present in the original copolymer. Preferably, it contains from about 0.5 to about 2 weight percent of chlorine or from about 0.5 to about 5 weight percent bromine. Most preferably, the halogenated polymer is a halogenated butyl rubber containing from about 1.0 to about 1.5 weight percent chlorine or from about 1.0 to about 2.5 weight percent bromine. The halogenated isobutylene-isoprene copolymer rubber can also contain more than one halogen in its structure, e.g., chlorine and bromine.

The butyl rubber may be halogenated by means known in the art. The solid rubber may be reacted in an extruder using halogen gas or on a hot rubber mill or internal mixer with a compound which releases halogen such as N-halo-succinimide and N-halo-hydantoin. Alternatively, the butyl rubber may be dissolved in an inert hydrocarbon solvent such as pentane, hexane or cyclohexane and halogenated by addition to the solution of elemental chlorine or bromine. In a typical commercial process, butyl rubber is dissolved in a solvent to form a solution containing from about 5 to about 30 weight percent of rubber. Elemental chlorine or bromine is added to the solution, at a temperature of 0° to about 100° C., in sufficient quantity that the chlorinated or brominated rubber recovered contains up to 1 atom of chlorine or up to 3 atoms of bromine per carbon-carbon double bond originally in the butyl rubber.

The Mooney viscosity of the halobutyl rubbers useful in the instant invention as measured at 125° C. (ML 1+4) range from about 20 to about 80, more preferably about 25 to about 55, and most preferably about 30 to about 50.

Suitable halogen-containing copolymers of a $C_4$ to $C_7$ isomonoolefin and a para-alkylstyrene for use as a component of the present tire sidewall composition comprise at least 0.5 weight percent of the para-alkylstyrene moiety. For elastomeric copolymer products, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from above zero to about 7.5 weight percent, preferably from about 1.0 to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-halo alkyl groups. Particularly preferred copolymers comprise from about 5 to about 10 weight percent para-alkylstyrene, and from about 1 to about 2 weight percent halogen, for example, bromine.

The copolymers of the isomonoolefin and para-alkylstyrene useful to prepare the halogen-containing copolymers suitable as component of the tire sidewall composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}_n$) of at least about 25,000, preferably at least about 30,000, more preferably at least about 100,000. The copolymers also, preferably, have a ratio of weight average molecular weight ($\overline{M}_w$) to number average molecular weight ($\overline{M}_n$), i.e., $\overline{M}_w/\overline{M}_n$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the inter-compositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

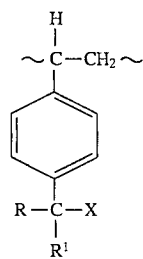

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40 to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scission and/or crosslinking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azo bis isobutyronitrile (AIBN), azo bis(2,4 dimethyl valero)nitrile, azo bis(2 methyl butyro)nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as crosslinking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively nonreactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, e.g., AIBN or VAZO® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

The aromatic halomethyl groups permit facile crosslinking to be accomplished in a variety of ways, for example, either directly through the halomethyl group or by conversion to other functional groups, as indicated above, to permit the desired crosslinking reactions to be employed. Direct crosslinking can be effected with a variety of polyfunctional nucleophilic reagents such as ammonia, amines, or polyamines; metal dicarboxylates; metal dithiolates; promoted metal oxides (e.g., ZnO+zinc stearates and/or dithiocarbamates), etc. Crosslinking can also be effected via polyalkylation reactions. The aromatic halomethyl groups thus provide a wide choice of crosslinking reactions which can be used.

Various fillers can also be used in the blend compositions of the present invention, and these include a variety of carbon blacks, clays, silicas, carbonates, oils, resins, and waxes. Carbon blacks preferred for use in black tire sidewall compositions of this invention include those types designated N339, N774, N660, N351 and N375; the latter two types are particularly preferred. Alternatively, non-black fillers and pigments may be used for white tire sidewalls. The blends are cured with conventional curatives for highly unsaturated or chlorobutyl rubbers, including sulphur, alkylphenol disulphide, zinc oxide, sulphenamide derivatives, guanidines, benzothiazyldisulphide (MBTS) and mercaptobenzothiazole (MBT).

The tire sidewall composition of the present invention may be vulcanized by subjecting it to heat and/or light or radiation according to any vulcanization process. Typically, the vulcanization is conducted at a temperature ranging from about 100° C. to about 250° C., preferably from about 140° C. to about 200° C., for a time period ranging from one minute to several hours.

The tire sidewall composition of the present invention may be used in producing sidewall for tires, for example, motor vehicle tires such as truck tires, bus tires, passenger automobile, motorcycle tires, and the like.

Suitable tire sidewall compositions may be prepared by using conventional mixing techniques including, e.g., kneading, roller milling, extruder mixing, internal mixing (such as with a Banbury® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the rubber components, fillers, and plasticizer are added and the composition mixed for the desired time or to a particular temperature to achieve adequate dispersion of the ingredients. Alternatively, the rubbers and a portion of the fillers (e.g., one-third to two-thirds) is mixed for a short time (e.g., abut 1 to 3 minutes) followed by the remainder of the fillers and oil. Mixing is continued for about 5 to 10 minutes at high rotor speed during which time the mixed components reach a temperature of about 140° C. Following cooling, the components are mixed in a second step on a rubber mill or in a Banbury mixer during which the curing agent and optional accelerators, are thoroughly and uniformly dispersed at relatively low temperature, e.g., about 80 to about 105° C. Variations in mixing will be readily apparent to those skilled in the art and the present invention is not limited to any specific mixing procedure. The mixing is performed to disperse all components of the composition thoroughly and uniformly.

Tires are generally built on a drum from at least three layers, namely, an outer layer comprising a tread portion and sidewalls, an intermediate layer, and an inner layer. After the uncured tire has been built on a building drum, the uncured tire may be placed in a heated mold to shape it and heat it to vulcanization temperatures and, thereby, to produce a cured unitary tire from the multi-layers.

Vulcanization of a molded tire, typically, is carried out in heated presses under conditions well known to those skilled in the art.

Curing time will be affected by the thickness of the tire to be molded and the concentration and type of curing agent as well as the halogen content of the halogenated copolymer. However, the vulcanization parameters can readily be established with a few experiments utilizing e.g., a laboratory characterization device well known in the art, the Monsanto Oscillating Disc Cure Rheometer (ODR, described in detail in American Society for Testing and Materials, Standard ASTM D 2084).

The following examples are presented to illustrate the invention. All parts and percentages herein are by weight unless otherwise specified.

EXAMPLE 1

A tire sidewall composition was prepared by compounding the components as set forth in Table I (Banbury size B) using a mix cycle as shown below. Composition 1-1 is a "control" or reference composition, not a composition of the present invention.

TABLE I

| Composition No. | 1-1 | 1-2 | 1-3 | 1-4 |
|---|---|---|---|---|
| SMR 20[1] | 50 | 45 | 45 | 45 |
| SMR 5[1] | — | 45 | 45 | 45 |
| BR1207[2] | 50 | — | — | — |
| BRBU 2233[3] | — | 45 | — | — |
| Vistalon 6505[4] | — | 10 | 10 | — |
| BrIB-PMS A[5] | — | — | 45 | 55 |
| N 660 Black | 50 | — | — | — |
| N 339 Black | — | 25 | 25 | 25 |
| N 774 Black | — | 25 | 25 | 25 |
| Flexon 641 Oil | 10 | 12 | 12 | 12 |
| SP 1077 Resin | — | 3 | 5 | 5 |
| Wood Rosin FF | — | 2 | — | — |
| Stearic Acid | 2 | 1 | 2 | 2 |
| Flectol H | 2 | — | — | — |
| Santoflex 13 | 2 | — | — | — |
| Sunolite 240 Wax | 1 | — | — | — |
| Zinc Oxide | 3 | 3 | 1 | 1 |
| Sulfur | 1.75 | 0.2 | 0.2 | 0.2 |
| Santocure MOR | 1 | — | — | — |
| Vultac 5 | — | 0.4 | 0.4 | 0.4 |
| MBTS | — | 1.2 | 1.2 | 1.2 |

[1]. Natural Malaysian Rubber
[2]. BR 1207 - polybutadiene rubber-Mooney viscosity of 55 at 100° C.
[3]. BRBU 2233 - Brominated butyl rubber having 2 wt. % bromine and a Mooney viscosity of 38 at 125° C.
[4]. Vistalon 6505 - EPDM terpolymer having 50 wt. % of ethylene, 50 wt. % of propylene and 9 wt. % of ENB and a Mooney viscosity of 55 at 125° C.
[5]. Isobutylene-para-methylstyrene copolymer having 5 wt. % para-methylstyrene, 1.1 wt. % bromine and a Mooney viscosity at 125° C. of 30.

Mix Cycle
0 min - add polymers and stearic acid
1.0 min - add black
2.2 min - add other ingredients except ZnO and curatives
4.0 min - dump 140° C.
Zinc oxide and curatives added on a cool mill The tire sidewall blend compositions (1-1 to 1-4) were tested for static ozone, dynamic ozone and fatigue crack propagation; the results are summarized in Table II.

TABLE II

| | 1-1 | 1-2 | 1-3 | 1-4 |
|---|---|---|---|---|
| Static Ozone 100 pphm. 30° C. 660 kPa Stress Time to Failure, h | <24 | 160 | >300 | >300 |
| Dynamic Ozone* 100 pphm, 0–20% ext, 30° C. Time to Failure, h | 48 | >288 | >288 | >288 |
| Fatigue Crack Propagation* DC/DN at 15% Strain, 60° C. | | | | |
| In air, Nm/cyc | 30.9 | 26.2 | 20.4 | 16.2 |
| In Ozone, Nm/cyc | 48.5 | 40.8 | 22.9 | 18.0 |

*Dynamic ozone and fatigue crack propagation tests are described in an article by D. G. Young in Rubber Chemistry ard Technology - Vol. 58, No. 4.

Blends 1-3 and 1-4 exhibited better ozone resistance and low fatigue crack propagation.

EXAMPLE 2

Sidewall blend compositions were prepared according to the procedure of Example 1 as shown in Table III.

TABLE III

| Composition No. | 2-1 | 2-2 |
|---|---|---|
| SMR 5 | 60 | 30 |
| Butadiene rubber 1207 | — | 30 |
| BrIB-PMS A | 40 | 40 |
| N660 Black | 50 | 50 |
| Flexon 641 Oil | 12 | 12 |
| Escorez 1102 | 5 | 5 |
| Stearic Acid | 2 | 2 |
| Zinc Oxide | 1.5 | 1.5 |
| Sulfur | 0.4 | 0.4 |
| Vultac 5 | 0.4 | 0.4 |
| MBTS | 1.2 | 1.2 |

The sidewall blend compositions (2-1 and 2-2) were tested for adhesion to general purpose rubber (GPR) composition, Tan Delta and dynamic ozone; the test results are summarized in Table IV.

TABLE IV

| | 2-1 | 2-2 | Control* |
|---|---|---|---|
| Adhesion To GPR, 25° C. 70NR/15SBR/15BR, kN/m | 8.9 (I) | 10.5 (T/I) | 25 (T) |
| Tan Delta 100 Hz, ± 10% strain, 60° C. | 0.143 | 0.096 | 0.050 |
| Dynamic Ozone 100 pphm, 0–20% ext, 30° C. Time to Failure, h | >200 | >144–<168 | 48 |

*Control is formulation 1-1

The use of butadiene rubber in the blend composition resulted in some improvement in adhesion (I refers to interfacial separation, T refers to tearing failure) and a significant reduction in Tan Delta.

EXAMPLE 3

Tire sidewall blend compositions were prepared, generally according to the procedure of Example 1, using the formulations shown in Table V. The compositions used brominated copolymers of isobutylene-para-methylstyrene, variations in the type and concentration of the highly unsaturated rubbers as well as variations in carbon black type and curative concentration. The variations are within the scope of the invention and represent preferred compositions useful as tire sidewall components. Properties of the compositions are shown in Table VI.

TABLE V

| Composition No. | 3-1 | 3-2 | 3-3 | 3-4 |
|---|---|---|---|---|
| Natural Rubber (SMR 5) | 30 | 30 | 25 | 25 |
| BR 1207 | 30 | 30 | 35 | 40 |
| BrIB-PMS B[1] | 40 | — | 40 | 35 |
| BrIB-PMS C[2] | — | 40 | — | — |
| N660 Black | 50 | 50 | 50 | — |
| N351 Black | — | — | — | 40 |
| Flexon 641 Oil | 12 | 12 | 12 | 12 |
| Escorez 1102 Resin | 5 | 5 | — | — |
| SP 1077 Resin | — | — | 5 | 5 |
| Stearic Acid | 2 | 2 | 1 | 1 |
| Zinc Oxide | 3 | 3 | 1 | 1 |
| Sulfur | 0.4 | 0.4 | 1.0 | 1.0 |
| Vultac 5 | 1.5 | 1.5 | 0.8 | 0.8 |
| MBTS | 1.7 | 1.7 | 0.75 | 0.75 |

TABLE V-continued

| Composition No. | 3-1 | 3-2 | 3-3 | 3-4 |
|---|---|---|---|---|

[1]. Brominated isobutylene-paramethylstyrene copolymer: 5 wt. % paramethylstyrene, 1.95 wt. % bromine and a Mooney viscosity at 125° C. of 29.
[2]. Brominated isobutylene-paramethylstyrene copolymer: 10 wt. % paramethylstyrene, 1.95 wt. % bromine and a Mooney viscosity at 125° C. of 29.

TABLE VI

| Composition No. | 3-1 | 3-2 | 3-3 | 3-4 |
|---|---|---|---|---|
| Dynamic Ozone 100 pphm, 0–20% ext., 30° C. Time to failure, h | 120 | >216 | >300 | >200 |
| Static Ozone 100 pphm, 30° C., 660 kPa Time to failure, h | >216 | >216 | — | — |
| Tan Delta 100 Hz,± 5% strain, 60° C. | 0.100 | 0.098 | 0.126 | 0.127 |
| Adhesion to GPR, kN/m | | | | |
| 25° C. | — | — | >35 (T) | — |
| 100° C. | 9.5 (T) | 9.8 (T) | 12.3 (T) | 19.2 (T) |
| Mooney Scorch, 135° C. Min. to 5 pt. rise | 7.9 | 7.9 | 11.4 | 11.7 |

These compositions of the invention demonstrate outstanding resistance to ozone and are capable of developing good adhesion, acceptable processing safety (Mooney scorch) and tan delta (resilience). A range of preferred tire sidewall performance properties can be achieved using the halogenated isobutylene-para-alkylstyrene copolymer. The specific concentrations of ingredients to be used in a formulation will be dependent on the specific needs of the tire manufacturing process and the environment in which the tire is used.

EXAMPLE 4

A white tire sidewall composition was prepared by compounding the components shown in Table VII (Banbury size B?) using a mix cycle shown below. Compositions 4-1, 4-2, 4-3, 4-4, and 4-5 were compositions in accordance with the present invention. Composition 4-6 was a comparative composition which was not in accordance with the present invention.

Copolymer A was a halogenated copolymer of isobutylene and para-methylstyrene containing 10 wt. % para-methylstyrene moieties, 2.5 wt. % bromine, a Mooney viscosity at 125° C. of 46, and 1.5 mole % brominated para-methylstyrene moieties. Copolymer B was a copolymer of isobutylene and a para-methylstyrene containing 15 wt. % para-methylstyrene moieties; 2.0 wt. % bromie, a Mooney viscosity at 125° C. of 50, and 1.1 mole % brominated para-methylstyrene moieties.

TABLE VII

| Composition No. | 4-1 | 4-2 | 4-3 | 4-4 | 4-5 | 4-6 |
|---|---|---|---|---|---|---|
| CIIR 1066 | — | — | — | — | — | 55 |
| Vistalon 6505 | — | — | — | — | 20 | |
| Copolymer A | 70 | 70 | — | — | — | |
| Copolymer B | — | — | 70 | 60 | 50 | — |
| SMR 5 | 30 | 30 | 30 | 40 | 50 | 25 |
| TiO$_2$ 1000 | 25 | 25 | 25 | 25 | 25 | 25 |
| Nucap 290 | 32 | 32 | 32 | 32 | 32 | 32 |
| Mistron Vapor | 34 | 34 | 34 | 34 | 34 | 34 |
| Sunolite 240 Wax | 3 | 3 | 3 | 3 | 3 | 3 |
| Stearic Acid | 1 | 1 | 1 | 1 | 1 | 1 |
| Ultramarine Blue | 0.2 | 0.2 | 0.2 | 0.2 | 0.2 | 0.2 |
| Escorez 1102 | 4 | 4 | 4 | 4 | 4 | 4 |
| Zinc Oxide | 3 | 3 | 3 | 3 | 3 | 5 |
| Sulfur | 0.5 | 1.3 | 1.0 | 1.0 | 1.0 | 0.5 |
| Vultac #5 | 1.3 | 1.0 | 1.3 | 1.3 | 1.3 | 1.3 |
| MBTS | 1.0 | 1.0 | 1.0 | 1.0 | 1.0 | 1.0 |

Mix Cycle 0 minute - add polymers
1.0 minute - add one half the remaining ingredients
2.2 minutes - add balance of ingredients
4.0 minutes - dump 140° C.
Zinc oxide and curelines added on cool mill.

Tire sidewall compositions of Table VII were tested for various properties. The results of the tests are shown in Table VIII.

TABLE VIII

| | Compositions | | | | | |
|---|---|---|---|---|---|---|
| Properties | 4-1 | 4-2 | 4-3 | 4-4 | 4-5 | 4-6 |
| Mooney Scorch, 135° C. Min. to 5 pt. Rise | 24.3 | 20.3 | 15.0 | 15.2 | 15.8 | 18.8 |
| Mooney Viscosity ML - 1 + 4' @ 100° C. | 45 | 46 | 46 | 46 | 46 | 44 |
| Rheometer - 160° C. | | | | | | |
| MH, in. - lb. | 43.0 | 43.1 | 45.5 | 42.0 | 43.3 | 39.8 |
| ML, in. - lb. | 7.5 | 6.8 | 4.5 | 4.8 | 5.0 | 7.0 |
| ts2, min. | 5.8 | 5.9 | 4.7 | 4.7 | 4.6 | 4.7 |
| tc90, min. | 23.2 | 21.8 | 20.8 | 15.2 | 14.8 | 20.8 |
| Tensile, MPa | 13.1 | 13.4 | 13.2 | 14.2 | 14.1 | 9.3 |
| 300% Modulus, MPa | 4.5 | 6.4 | 6.5 | 5.4 | 5.5 | 4.3 |
| % Elongation | 700 | 620 | 530 | 640 | 627 | 603 |
| Shore A Hardness | 55 | 55 | 57 | 56 | 57 | 52 |
| Dynamic Ozone 100 pphm, 20% Ext. Hrs. to Crack | 500+ | 500+ | 500+ | 500+ | 500+ | 500+ |

TABLE VIII-continued

| Properties | Compositions | | | | | |
|---|---|---|---|---|---|---|
| | 4-1 | 4-2 | 4-3 | 4-4 | 4-5 | 4-6 |
| Static Ozone 100 pphm, Bent Loop Hrs. to Crack | 500+ | 500+ | 500+ | 500+ | 500+ | 500+ |
| Strip Adhesion - Kn/m. (Tc90 + 5' @ 160° C.) To black sidewall: | | | | | | |
| @ RT | 4.5 | 3.9 | 4.0 | 3.9 | 5.9 | 3.6 |
| @ 100° C. | 2.0 T | 2.0 T | 1.7 T | 2.1 T | 3.1 T | 1.5 T |
| Outdoor Flex (Pierced Only) | 500+ | 500+ | 500+ | 500+ | 500+ | 500+ |
| Weatherometer Hrs. to Crack | 700+ | 700+ | 700+ | 700+ | 700+ | 700+ |

The test methods are shown in Table IX.

TABLE IX

| Test Method | Test |
|---|---|
| Mooney Scorch | ASTM D1646 |
| | ASTM D1646 |
| Mooney Viscosity | ASTM D1646 |
| Tensile, MPa | ASTM D412 |
| 300% modulus | ASTM D412 |
| % Elongation | ASTM D412 |
| Shore A Hardness | ASTM D2240 |
| Dynamic Ozone | ASTM D3395 |
| Static Ozone | ASTM D1149 |
| Strip Adhesion | ASTM D2630 |
| Outdoor Flex below | Described |

The outdoor flex test is performed by cutting a specimen into a strip and fastening the strip at both ends across a horizontal rod. Thereafter, the fastened specimen is repeatedly flexed in a forward and backward motion. The test specimen is observed at regular intervals, e.g. daily for indication of cracking. The results are reported as hours to the first indication of cracking.

As can be seen from Table VIII, the compositions of the present invention had improved cured adhesion and comparable performance in ozone and ultraviolet resistance at higher levels of natural rubber (compare Composition 4-5 of the present invention to comparative Composition 4-6).

EXAMPLE 5

White sidewall compositions were prepared by compounding the components shown in Table X using the mix cycle shown in Example 4. Copolymer C was a brominated copolymer of isobutylene and para-methylstyrene containing 15 wt. % para-methylstyrene moieties and 2 wt. % bromine. Copolymer D was a brominated copolymer of isobutylene and para-methylstyrene containing 10 wt. % para-methylstyrene moieties and 2 wt. % bromine. Copolymer E was a brominated copolymer of isobutylene and para-methylstyrene containing 7.5 wt. % para-methylstyrene moieties and 2 wt. % bromine. Copolymer F was a copolymer of isobutylene and para-methylstyrene containing 5 wt. % para-methylstyrene moieties and 1 wt. % bromine.

TABLE X

| Composition No. | 5-1 | 5-2 | 5-3 | 5-4 | 5-5 | 5-6 | 5-7 | 5-8 |
|---|---|---|---|---|---|---|---|---|
| Copolymer C | 50 | — | — | — | — | — | — | 35 |
| Copolymer D | — | 60 | — | 50 | — | — | — | — |
| Copolymer E | — | — | — | — | 60 | 50 | 35 | — |
| Copolymer F | — | — | 70 | — | — | — | — | — |
| Natural Rubber | 50 | 40 | 30 | 50 | 40 | 50 | 65 | 65 |
| TiO$_2$ | 25 | 25 | 25 | 25 | 25 | 25 | 25 | 25 |
| Nucap 290 | 32 | 32 | 32 | 32 | 32 | 32 | 32 | 32 |
| Mistron Vapor Talc | 34 | 34 | 34 | 34 | 34 | 34 | 34 | 34 |
| Sunolite 240 Wax | 3 | 3 | 3 | 3 | 3 | 3 | 3 | 3 |
| Stearic Acid | 1 | 1 | 1 | 1 | 1 | 1 | 1 | 1 |
| Ultramarine Blue | 0.2 | 0.2 | 0.2 | 0.2 | 0.2 | 0.2 | 0.2 | 0.2 |
| Escorez 1102 | 4 | 4 | 4 | 4 | 4 | 4 | 4 | 4 |
| Zinc Oxide | 3 | 3 | 3 | 3 | 3 | 3 | 3 | 3 |
| Sulfur | 1.0 | 1.0 | 1.0 | 1.0 | 1.0 | 1.0 | 1.0 | 1.0 |
| Vultac #5 | 1.0 | 1.3 | 1.3 | 1.3 | 1.3 | 1.3 | 1.3 | 1.3 |
| MBTS | 1.3 | 1.0 | 1.0 | 1.0 | 1.0 | 1.0 | 1.0 | 1.0 |

The tire sidewall compositions of Table X were tested for various properties. The results of the tests are shown in Table XI.

TABLE XI

| Properties | Compositions | | | | | | | |
|---|---|---|---|---|---|---|---|---|
| | 5-1 | 5-2 | 5-3 | 5-4 | 5-5 | 5-6 | 5-7 | 5-8 |
| Mooney Scorch, 135° C. Min. to 5 pt. rise | 16.7 | 16.7 | 18.4 | 15.5 | 14.1 | 13.7 | 13.9 | 14.2 |
| Mooney Viscosity ML (1 + 4) @ 100° C. | 40 | 38 | 38 | 38 | 49 | 49 | 46 | 38 |
| Rheometer - 160° C. 3° ARC. | | | | | | | | |
| $M_L$, lbf-in. | 6.0 | 7.0 | 6.5 | 7.0 | 9.8 | 10.0 | 10.0 | 7.8 |
| $M_H$, lbf-in. | 46.0 | 46.0 | 44.6 | 42.5 | 44.8 | 47.5 | 48.5 | 47.0 |
| $t_{sa}$, min. | 5.0 | 5.0 | 5.8 | 4.8 | 5.0 | 4.5 | 4.8 | 4.8 |
| $t'_{c90}$, min. | 11.1 | 15.0 | 17.2 | 13.0 | 14.1 | 12.0 | 11.4 | 11.0 |
| Shore A | 52 | 55 | 52 | 50 | 55 | 54 | 52 | 50 |
| Cured Properties @ $t'_{c90}$, 160° C. | | | | | | | | |
| Tensile, mPa | 13.6 | 13.8 | 11.4 | 13.9 | 14.5 | 16.9 | 18.8 | 17.1 |
| 300% Modulus, mPa | 6.2 | 6.3 | 4.7 | 5.7 | 6.4 | 6.7 | 6.7 | 7.3 |
| % Elongation | 540 | 528 | 633 | 557 | 577 | 575 | 607 | 522 |
| Dynamic Ozone 20% Ext., 100 pphm Hours to crack | 200+ | 200+ | 200+ | 200+ | 200+ | 200+ | <100 | <100 |
| Static Ozone Bent Loop-100 pphm Hours to crack | 200+ | 200+ | 200+ | 200+ | 200+ | 200+ | <100 | <100 |
| Outdoor Flex DeMattia-Pierced Hours to crack | 500+ | 500+ | 500+ | 500+ | 500+ | 500+ | <400 | <400 |
| Die B Tear | | | | | | | | |
| @ RT[1] | 21.5 | 22.1 | 22.2 | 20.9 | 23.1 | 23.0 | 23.8 | 20.9 |
| @ 100° C. | 12.0 | 11.9 | 12.4 | 11.4 | 11.8 | 12.0 | 11.6 | 11.1 |
| Strip Adhesion To Self: | | | | | | | | |
| @ RT | 7.8 | 7.2 | 8.8 | 7.2 | 7.2 | 7.9 | 8.6 | 6.4 |
| @ 100° C. | 2.9 | 2.5 | 2.3 | 2.6 | 1.9 | 2.6 | 2.8 | 1.9 |
| To General Purpose Rubber Black Sidewall | | | | | | | | |
| @ RT | 7.1 | 6.8 | 7.0 | 6.5 | 7.2 | 7.2 | 7.2 | 5.3 |
| @ 100° C. | 2.6 | 2.1 | 2.1 | 2.1 | 2.3 | 2.8 | 3.0 | 2.1 |

[1]RT means room temperature

As can be seen from Table XI, Compositions 5-1 through 5-8, which were compositions in accordance with the present invention comprising the preferred ratios of components, had particularly improved properties, such as ozone resistance, resistance to cracking, and good adhesion to tire carcass.

A description of ingredients used in the above examples that are not otherwise described is shown in Table XII.

TABLE XII

| Ingredient | Description | Supplier |
|---|---|---|
| Escorez 1102 | Petroleum hydrocarbon tackifier resin | Exxon Chemical Americas |
| Flectol H | Polymerized 1,2 dihydro-2,2,4-trimethylquinoline | Harwick Chemical Corp. |
| Flexon 641 Oil | Naphthenic petroleum oil (ASTM Type 103) | Exxon Co., USA |
| Santocure MOR | 2-(morpholinothio)benzothiazole | Monsanto Chemical Co. |
| Santoflex 13 | N,N'-phenyl-p-phenylene diamine | Monsanto Chemical Co. |
| SP 1077 Resin | Alkyl phenolformaldehyde resin | Schenectady Chemicals |
| Sunolite 240 Wax | Blend of petroleum waxes | Witco Chemical |
| Vultac 5 | Alkyl phenol disulfide on inert carrier | Pennwalt Chemical |
| Wood Rosin FF | Thermoplastic naval stores tackifying resin | Harwick Chemical Corp |
| Nucap 290 | Mercaptosilane functionalized hydrated aluminum silicate | J. M. Huber |
| Mistron Vapor | Magnesium silicate organo-functional surface modified | Cyprus Industrial Minerals |
| CIIR 1066 | Chloro-isobutene-isoprene | Exxon Chemical, USA |
| Ultramarine Blue | Powdered pigment | AKROCHEM |

EXAMPLE 6

White sidewall compositions were prepared by compounding the components shown in Table XIII using the mix cycle shown in Example 4. Copolymer G was a brominated copolymer of isobutylene and para-methylstyrene containing 7.5 wt. % para-methylstyrene moieties and 2 wt. % bromine. Composition 6-1 was a control composition prepared from ethylene-propylenediene rubber (Vistalon®6505) blended with chlorinated butyl rubber (Chlorobutyl 1066).

TABLE XIII

| Composition No. | 6-1 | 6-2 | 6-3 | 6-4 | 6-5 | 6-6 | 6-7 | 6-8 |
|---|---|---|---|---|---|---|---|---|
| Chlorobutyl 1066 | 60 | — | | | | | | |
| Vistalon ® 6505 | 20 | — | | | | | | |
| Copolymer G | — | 40 | 40 | 40 | 50 | 60 | 35 | 35 |
| Natural Rubber | 20 | 60 | 60 | 60 | 50 | 40 | 65 | 65 |
| T.O$_2$ | 45 | 45 | 45 | 45 | 45 | 45 | 45 | 45 |
| NUCAP 290 | 45 | 45 | 45 | 45 | 45 | 45 | 45 | 45 |
| Stearic Acid | 2 | 2 | 2 | 2 | 2 | 2 | 2 | 2 |
| Ultra Marine Blue | 0.4 | 0.4 | 0.4 | 0.4 | 0.4 | 0.4 | 0.4 | 0.4 |
| Sunolite 240 Wax | 1 | — | — | — | — | — | — | — |
| Escorez 1102 | 4 | 4 | 4 | 4 | 4 | 4 | 4 | 4 |
| Zinc Oxide | 5 | 3 | 3 | 3 | 3 | 3 | 3 | 3 |
| Zinc Stearate | — | 1 | 1 | 1 | 1 | 1 | 1 | 1 |
| Sulfur | 0.8 | 0.3 | 0.2 | 0.2 | 0.2 | 0.3 | 0.2 | 0.2 |
| Vultac #5 | 1.3 | 1.0 | 1.1 | 1.0 | 1.0 | 1.3 | 1.2 | 1.0 |
| MBTS | 1.0 | 1.3 | 1.3 | 1.2 | 1.3 | 1.3 | 1.2 | 1.0 |

The tire sidewall compositions of Table XIII were tested for various properties. The results of the tests are shown in Table XIV.

TABLE XIV

| | Compositions | | | | | | | |
|---|---|---|---|---|---|---|---|---|
| Properties | 6-1 | 6-2 | 6-3 | 6-4 | 6-5 | 6-6 | 6-7 | 6-8 |
| Mooney Scorch, 135° C.-min to 5 pt. Rise | 12.6 | 11.5 | 11.4 | 11.6 | 11.7 | 12.4 | 12.1 | 11.6 |
| 121° C.-min to 5 pt. Rise | 22.8 | 21.9 | 20.7 | 19.8 | 18.5 | 18.9 | 19.9 | 21.8 |
| Mooney viscosity ML - 1 + 4 @100° C. | 51 | 46 | 48 | 47 | 48 | 53 | 54 | 50 |
| Rheometer ¯3°ARC @150° C. | | | | | | | | |
| MH-ML | 29.0 | 31.8 | 30.0 | 31.0 | 31.0 | 28.0 | 27.8 | 30.2 |
| t'90, min @160° C. | 26.3 | 26.3 | 26.5 | 27.1 | 26.5 | 26.1 | 25.6 | 26.7 |
| MH-ML | 35.9 | 36.5 | 30.0 | 33.5 | 30.8 | 37.2 | 35.0 | 30.5 |
| t'90, min | 18.3 | 15.8 | 15.8 | 12.9 | 15.8 | 16.8 | 15.0 | 14.3 |
| Cured Properties | | | | | | | | |
| Hardness, Shore A | 60 | 54 | 53 | 55 | 54 | 53 | 51 | 51 |
| 300% Modulus MPa | 4.1 | 5.7 | 6.9 | 6.6 | 6.3 | 7.5 | 5.8 | 5.1 |
| Tensile, MPa | 9.9 | 17.3 | 17.0 | 16.8 | 14.1 | 14.8 | 18.5 | 16.9 |
| % Elongation | 690 | 620 | 590 | 590 | 580 | 540 | 650 | 650 |
| Dynamic Ozone 20% Ext.-100 pphm Hours to Crack | 300+ | 300+ | 300+ | 300+ | 300+ | 300+ | Slight Cracking at 200 hrs | 300+ |
| Static Ozone Bent loop-100 pphm Hours to Crack | 300+ | 300+ | 300+ | 300+ | 300+ | 300+ | 300+ | 300+ |
| Outdoor Flex DeMattia-Pierced Hours to Crack | 500+ | 500+ | 500+ | 500+ | 500+ | 500+ | Slight Cracking at 200 hrs | 500+ |
| Weatherometer Hours to Crack | 600+ | 600+ | 600+ | 600+ | 600+ | 600+ | 600+ | 600+ |
| Die B Tear, Kn/M | | | | | | | | |
| @RT[(1)] | 32.7 | 28.9 | 31.7 | 25.4 | 27.1 | 24.9 | 20.8 | 20.7 |
| @ 100° C. | 12.8 | 26.9 | 22.6 | 22.7 | 19.8 | 16.9 | 19.4 | 17.2 |

TABLE XIV-continued

| Properties | Compositions | | | | | | | |
|---|---|---|---|---|---|---|---|---|
| | 6-1 | 6-2 | 6-3 | 6-4 | 6-5 | 6-6 | 6-7 | 6-8 |
| Cured Adhesion KN/m | | | | | | | | |
| @RT to | | | | | | | | |
| Self | 12.7 | 10.9 | 17.0 | 16.4 | 18.7 | 10.8 | 11.1 | 11.2 |
| Carcass | 10.2 | 8.8 | 9.7 | 8.5 | 9.1 | 9.7 | 9.1 | 9.4 |
| Coverstrip | 10.9 | 9.7 | 18.7 | 16.4 | 8.1 | 8.2 | 9.6 | 9.3 |
| @100° C. to | | | | | | | | |
| Self | 2.5 | 13.1 | 13.0 | 12.8 | 7.2 | 6.8 | 8.7 | 8.4 |
| Carcass | 1.6 | 4.7 | 9.7 | 9.5 | 9.6 | 5.1 | 6.5 | 6.0 |
| Coverstrip | 1.4 | 1.9 | 5.2 | 5.0 | 1.5 | 1.6 | 4.5 | 4.2 |

[1] RT = Room Temperature

In addition a Green Strip Tack test was performed comparing the control composition above with the two experimental compositions one containing a 60/40 blend of copolymers with natural rubber and the other containing 35/65 blend of copolymers with natural rubber. The results were as follows:

| | Control | 60/40 Blend | 35/65 Blend |
|---|---|---|---|
| Pounds-Pull to Self @RT | 0.3 | 1.5 | 3.1 |

From the date shown in Table XIV white sidewall compositions of the invention exhibit superior properties in the areas of green tack, cured adhesion and Die B teach thus the control without sacrificing performances in other properties.

What is claimed is:

1. A sidewall composition for a vulcanized tire consisting essentially of from about 10 to about 90 weight parts per hundred parts of total rubber of at least one unsaturated rubber selected from the group consisting of natural rubber, polyisoprene, styrene-butadiene rubber, polybutadiene rubber, and mixtures thereof, and from about 10 to about 90 weight parts per hundred parts of total rubber of a halogen-containing random copolymer of a $C_4$ to $C_7$ isomonoolefin and a para-alkylstyrene, said halogen being selected from the group consisting of chlorine, bromine and mixtures thereof, and crosslinking agents.

2. The sidewall composition of claim 1 wherein said unsaturated rubber is natural rubber.

3. The sidewall composition of claim 2 wherein the ratio of said halogen-containing copolymer to said natural rubber ranges from about 0.28:1 to about 3:1.

4. The sidewall composition of claim 1 wherein the sidewall composition is black and wherein said composition comprises carbon black.

5. The sidewall composition of claim 1 wherein said composition is white and wherein said composition comprises non-black additives selected from the group consisting of fillers, pigments, and mixtures thereof.

6. The sidewall composition of claim 1 wherein said halogen-containing copolymer comprises from about 0.5 to about 20 weight percent of said para-alkylstyrene.

7. The sidewall composition of claim 1 wherein said halogen-containing copolymer comprises from about 1 to about 7.5 weight percent of halogen.

8. The sidewall composition of claim 1 wherein said halogen comprises bromine and wherein said bromine is chemically bound to said para-alkylstyrene.

9. The sidewall composition of claim 1 wherein said halogen-containing copolymer is a bromine-containing copolymer of isobutylene and para-methylstyrene.

10. The sidewall composition of claim 1 wherein the para-alkylstyrene is of the formula

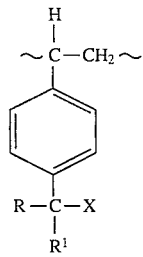

wherein R and $R^1$ are independently selected from the group consisting of hydrogen, a $C_1$ to $C_5$ alkyl group and a primary or secondary $C_1$ to $C_5$ alkyl halide and X is selected from the group consisting of bromine and chlorine and mixtures thereof.

11. The sidewall composition of claim 1 wherein the copolymer has a number average molecular weight of at least 25,000.

12. The sidewall composition of claim 1 wherein the ratio of weight average molecular weight to number average molecular weight of the copolymer is less than 6.

13. The tire sidewall composition of claim 1 wherein the crosslinking agent comprises a mixture of zinc stearate and sulfur.

14. A vulcanized tire wherein the sidewall is prepared from the composition of claim 1.

15. The vulcanized tire of claim 14, wherein said unsaturated rubber is natural rubber and wherein said halogen-containing copolymer and said natural rubber are the sole rubber components in said composition.

16. The vulcanized tire of claim 14, wherein the weight ratio of said halogen-containing copolymer to said natural rubber ranges from about 0.28:1 to about 3:1.

17. The vulcanized tire of claim 14 wherein said tire sidewall is black and wherein said composition comprises carbon black.

18. The vulcanized tire of claim 18, wherein said sidewall is white and wherein said composition comprises non-black additives selected from the group consisting of fillers, pigments, and mixtures thereof.

19. The vulcanized tire of claim 14, wherein said halogen-containing copolymer comprises from about 0.5 to about 20 weight percent of said para-alkylstyrene.

20. The vulcanized tire of claim 14, wherein said halogen-containing copolymer comprises from about 1 to about 7.5 weight percent of said halogen.

21. The vulcanized tire of claim 14, where said halogen comprises bromine and wherein said bromine is chemically bound to said para-alkylstyrene.

22. The vulcanized tire of claim 14, where said halogen-containing copolymer is a bromine-containing copolymer of isobutylene and para-methylstyrene.

* * * * *